United States Patent [19]

Smith et al.

[11] 4,447,910
[45] May 8, 1984

[54] PHASE TRACKING CORRECTION SCHEME FOR HIGH FREQUENCY MODEM

[75] Inventors: Earl F. Smith, Melbourne; Daniel D. McRae, West Melbourne, both of Fla.

[73] Assignee: Harris Corporation, Melbourne, Fla.

[21] Appl. No.: 269,607

[22] Filed: Jun. 2, 1981

[51] Int. Cl.³ .............................................. H04M 3/18
[52] U.S. Cl. ...................................... 375/99; 375/14; 375/118
[58] Field of Search ................. 375/99, 110, 118, 119, 375/11, 14, 1; 328/162–167; 358/36, 167; 455/295, 296; 179/15.55 R; 333/18, 14

[56] References Cited

U.S. PATENT DOCUMENTS

| | | | |
|---|---|---|---|
| 3,962,637 | 6/1976 | Motley et al. | 375/14 |
| 3,974,449 | 8/1976 | Falconer | 375/18 |
| 4,131,856 | 12/1978 | Chapman | 375/118 |
| 4,146,841 | 3/1979 | McRae | 375/119 |
| 4,263,555 | 4/1981 | Hunka | 328/162 |

*Primary Examiner*—Robert L. Griffin
*Assistant Examiner*—Stephen Chin
*Attorney, Agent, or Firm*—Antonelli, Terry & Wands

[57] ABSTRACT

An auxiliary phase tracking subsystem for compensating for fast phase changes in an adaptive transversal filter obtains a measure, from the received signal, of channel phase variations and corrects the phase of each received sample in accordance with this phase measure. The channel tracking weights are used in conjunction with the known transmitted symbols and the data decisions to "predict" the n received samples, $PR_i$, for each frame. The average difference in phase, DP, between the predicted samples, $PR_i$, and the actual received samples, $R_i$, is then used to determine the phase correction for each received sample prior to using it for making estimates. The received samples, $R_0, R_1, \text{———}, R_{n-1}$, are then corrected to obtain the corrected samples, $CR_0, CR_1, \text{———}, CR_{n-1}$, as follows:

$$CR_i = K_1 DP + iK_2 DP \qquad i = 0,1,\text{---},n-1 \qquad (1)$$

where:

$$DP = 1/n \sum_i [\theta(R_i) - \theta(PR_i)] \qquad (2)$$

and $K_1$ and $K_2$ are constants.

The result of this is to phase-correct each received sample by some constant phase, $K_1 DP$, plus an additional correction which increases linearly with time during the frame. This latter correction is, in effect, a "frequency offset" correction and when accumulated from frame-to-frame serves the function of doppler tracking as well as phase tracking.

17 Claims, 3 Drawing Figures

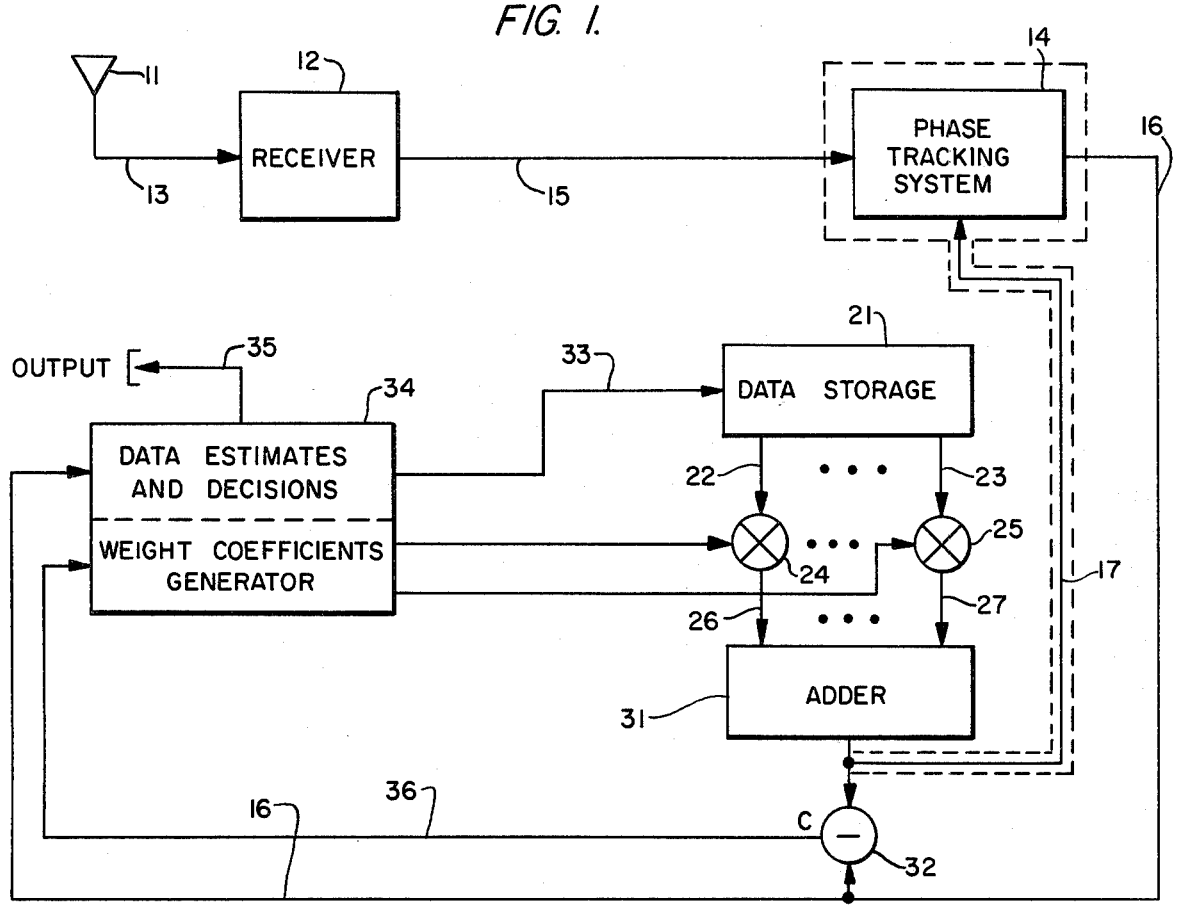
FIG. 1.
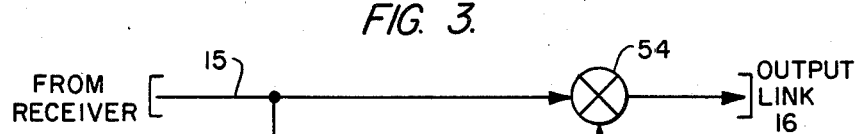
FIG. 3.
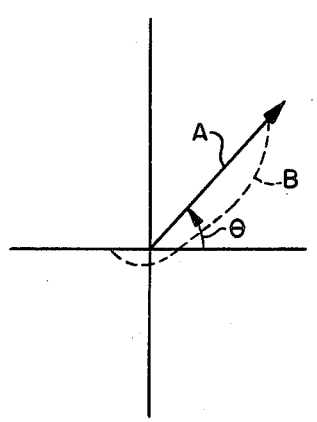
FIG. 2.
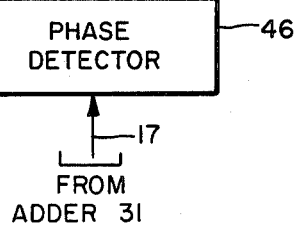

PHASE TRACKING CORRECTION SCHEME FOR HIGH FREQUENCY MODEM

FIELD OF THE INVENTION

The present invention relates to digital communication systems and, more particularly, to a scheme for tracking phase changes due to rapid channel variations or doppler variations and compensating phase offsets that influence the characteristics of a simulated transmission channel for deriving estimates of actually transmitted signals from received signal values.

BACKGROUND OF THE INVENTION

The advance and development of sophisticated digital communication systems has been accompanied by improvements in signal processing techniques employed at the receiving station, for eliminating or compensating for the effects of transmission distortion that may be introduced into the signal channel. These signal processing techniques include the use of adaptive equalizers or recursive filters through which the characteristics of the channel are estimated and the received data is subjected to a predistortion filter function based upon the observed influence of the channel on the received signals. For a general overview of such signal processing techniques and a description of a particularly advantageous scheme for handling high frequency data and overcoming the signal distortion-introducing characteristics of a dynamic dispersive communication channel, attention is directed to the description in copending application Ser. No. 163,516 filed June 27, 1980 by Daniel D. McRae et al entitled "Technique For High Rate Digital Transmission Over A Dynamic Dispersive Channel," now U.S. Pat. No. 4,365,338, issued Dec. 21, 1982 and assigned to the assignee of the present application. In accordance with the signal recovery technique described in the above-identified application, the disclosure of which is incorporated herein by reference, channel tracking weights of an adaptive transversal filter are updated or refined in accordance with a tracking scheme that simulates the effect of the dispersive medium over which the signals are transmitted. Estimates of the information signals that have been transmitted are produced in accordance with a preselected relationship between prescribed characteristics of the simulated effect of the dynamic dispersive channel and the received signals for successive frames of signals. Through an iterative process the estimates are refined to obtain predictions of actually transmitted data symbols to within a prescribed error tolerance.

Unfortunately, because of the necessary compromise between tracking speeds (loop gain) and stability in feedback systems such as the channel (weighting) tracking loop, the channel weights of such systems do not adjust rapidly enough to cope with fast phase changes due to rapid channel variations, especially during fades, or due to rapid doppler variations, so that, during such conditions there is a degradation in system performance. One way to compensate for rapid changes would be to establish an independent offset tracking function associated with each respective weight. Unfortunately, such an approach introduces noise into the signal prediction process which effectively negates the sought after improvement in system performance. Thus attempting to adjust the changed weights individually does not provide a useful solution to the problem.

SUMMARY OF THE INVENTION

In accordance with the present invention, the effective inability to rapidly adjust the channel weights of an adaptive transversal filter, such as is employed in the communication system described in the above-referenced copending application, to follow sudden phase changes which occur, for example, during fades and for doppler variations, is overcome by an auxiliary phase tracking technique that obtains a measure of channel phase variations and corrects the phase of each received symbol sample in accordance with this phase measure prior to the application of the received symbol samples to the signal processing scheme from which actual data estimates and channel tracking weights are obtained.

In the system described in the above-referenced copending application, the channel tracking weights are used in conjunction with known transmitted symbols and data decisions in order to predict respective received signal samples ($PR_i$) of each of successive frames of transmitted data. Pursuant to the auxiliary phase tracking scheme of the present invention, the average difference in phase (DP) between the predicted samples and the actually received samples ($R_i$) is employed to determine the phase correction for modifying each received sample prior to using it for making data symbol estimates. The successively received samples $R_0, R_1, R_2 \ldots R_{N-1}$ are then corrected to obtain successive corrected samples $CR_0, CR_1, CR_2 \ldots CR_{N-1}$. This is achieved is accordance with a set of relationships as follows:

$$CR_i = K_1 DP + iK_2 DP, \, i = 0, 1, 2, \ldots N - 1, \quad (1)$$

where $$DP = \frac{1}{N} \sum_i [\theta(R_i) - \theta(PR_i)], \quad (2)$$

with $K_1$ and $K_2$ being experimentally chosen.

The result of this operation is to phase-correct each received sample by some constant value ($K_1 DP$, the first term in equation (1)), plus an additional correction which increases linearly with time during the frame. This second term of equation (1) is, in effect, a frequency offset correction and, when accumulated from frame-to-frame, serves the function of both doppler and phase tracking.

By modifying the phases of the received symbols in this manner, the multidimensional problem of how to rapidly adjust a plurality of signal modifiers (i.e. the channel weights) without introducing noise into the system is reduced to a one dimensional problem (i.e. per received symbol), so that the goal of compensating for rapid phase changes while not introducing a separate operation delimiting influence is attained.

BRIEF DESCRIPTION OF THE DRAWINGS

FIG. 1 is a block diagram illustration of receiver equipment for processing signals received over a dynamic dispersive channel in which the received samples and channel weights are adjusted in accordance with an auxiliary phase tracking subsystem;

FIG. 2 is a phase plot for a typical symbol vector; and

FIG. 3 is a block diagram of the details of the phase tracking subsystem 14 of FIG. 1.

DETAILED DESCRIPTION

Referring now to FIG. 1 there is shown a schematic block diagram illustration of a signal processing receiver for making data estimates of incoming signals received over a dynamic dispersive channel. As was pointed out previously, the disclosure of application Ser. No. 163,516 filed June 27, 1980 is incorporated herein by reference. Except for the phase tracking system identified as block 14, the remainder of the signal processing circuitry shown in FIG. 1 effectively corresponds to that contained within the receiver signal processing circuitry including the symbol processor detailed in the above-referenced copending application. As noted above, the present invention constitutes an adjunct or auxiliary phase tracking modification to an adaptive transversal filter signal processing scheme, such as that described in the above-referenced copending application, and its association therewith will be detailed below. It should be noted here, however, that while the present invention may be readily incorporated in the communication system described in the above-referenced application, its use is not exclusively limited thereto, but has applicability to transversal filter tracking schemes in general.

Moreover, while the signal processing scheme of the above copending application is incorporated herein by reference, it will not be described in the detail as it is explained in that application. Instead, it will be set forth by reference to segments of the processing circuitry shown in FIG. 1 to be described below, in order that a more full understanding of the impact of the present invention and its association with such a system may be more readily appreciated.

Incoming phase modulated signals that have been transmitted over a dynamic dispersive channel are coupled from an antenna 11 over link 13 to a receiver section 12 in which the incoming carrier is stripped off and the resulting signal is demodulated. The output is applied over a link 15 to the adaptive transversal filter-simulating processor of which the remainder of the system shown in FIG. 1 is comprised.

Briefly, the adaptive transversal filter is represented by a number of functional components including a data storage register 21 containing a plurality of storage stages, output lines of only first and Nth ones of which 22 and 23 are shown. Each stage stores a respective successive data symbol sample corresponding to a symbol estimate coupled over link 33 from a data estimate and decision section of a processor unit 34. The contents of respective stages of the data storage register 21 are coupled to multipliers 24 . . . 25, which multiply the contents of the register 21 by weighting coefficients supplied from a weighting coefficient generator/data estimate and decision processor unit 34. The outputs of the multipliers 24 . . . 25 are coupled over lines 26 . . . 27 and summed in an adder 31, to produce a predicted signal sample, $PR_i$, on output line 17. Weighting coefficient generator/data estimate and decision unit 34 is a processor-based signal processing subsystem that operates in accordance with a prescribed measurement/evaluation function and selectively modifies or updates the weight multiplier values to be supplies to the multipliers 24 . . . 25, thereby simulating the distortion-introducing characteristics of the channel. As the details of unit 34 are not necessary for an understanding of the present invention they will not be described here. For a description of an exemplary signal processing system for producing data symbol estimates and channel tracking weights in accordance with received signal values and a prescribed dynamic dispersive channel simulating algorithm attention may be directed to the above herein incorporated referenced copending application.

In the system described in the above-referenced copending application, the data estimates produced on output link 17 are normally compared with the received signal on line 15 and differences between the two signal values are processed in unit 34 to modify the symbol estimates and weighting coefficients, as well as producing a final output representative of each predicated symbol on link 35.

As was mentioned previously, for a fast phase change due to a rapid channel variation, especially during fades or in the event of a rapid doppler variation, the channel weights do not adjust rapidly enough, because of the required compromise between the tracking speed, namely the loop gain, of the transversal filter and the stability in the feedback path of the channel weight tracking loop.

An illustration of this problem is presented in FIG. 2 which shows a phase plot of a typical signal vector. As shown in the figure, the signal vector has some amplitude A and phase angle $\theta$. In the event of a condition which creates a rapidly varying phase change, such as a fade, the tip of the signal vector may follow the path illustrated by the broken line B. In addition to a severe variation and reduction of the amplitude of the symbol, there is also a rapid change in its phase angle. Now, in phase modulation systems, where the amplitude changes do not create a problem, still the undesirable rapid rotation of the vector introduces a significant error problem into the signal processing scheme. In accordance with the present invention, an auxiliary phase tracking system representing by block 14 shown in FIG. 1 is coupled in the signal flow path at the output of the receiver and monitors differences in phase between the predicted transmitted signal values produced at the output of adder circuit 31 on link 17 and the received signal values from the receiver on link 15. The differences in phase in these signal values are averaged and employed to determine a phase correction for each received sample prior to its use in determining data symbol estimates or weight coefficient changes. The corrected received values are produced on line 16 and applied to weighting coefficient generation/data estimate and decision unit 34 and to a subtraction circuit 32. Subtraction circuit 32 compares the predicted transmitted values produced from adder 31 on link 17 and the corrected received values on link 16 and produces an error signal e representative of differences therebetween on link 36. This error signal is used in the weighting coefficient generation portion of unit 34 to update the values of each of the weighting coefficiences supplied to weighting coefficient multipliers 24 . . . 25. The corrected received values $CR_i$ on link 16 are also employed by the data estimate and decision portion of unit 34 to predict the symbol estimates on link 33 and thereby provide refined outputs on link 35. Again, for detailed description of an exemplary adaptive transversal filter function in accordance with which the symbol estimates and predicted data symbol values are produced, the above-referenced copending application contains a full description of signal processing operations for effectively carrying out the functions of the receiver circuitry shown in FIG. 1, save the phase tracking subsystem 14.

Referring now to FIG. 3 the details of the phase tracking subsystem 14 are shown. The predicted sample values obtained at the output of adder 31 from the transversal filter processing circuitry are applied on line 17 to a phase detector 46. The received sample output of receiver unit 12 on link 15 is applied to a separate phase detector 41. The respective phases of these signals are then compared in subtraction circuit 43 and an output representative of the difference therebetween is applied to a correction signal function generator represented by an averaging unit 45 and a complex number generator 52.

As explained briefly above in conjunction with the brief description of the invention, the received samples on link 15, namely successive samples $R_0, R_1 \ldots R_{N-1}$ are corrected to obtain corrected sampls $CR_0, CR_1 \ldots CR_{N-1}$, in accordance with equations 1 and 2 repeated here:

$$CR_i = K_1 DP + iK_2 DP, \ i = 0, 1, 2 \ldots N - 1, \quad (1)$$

where $$DP = \frac{1}{N} \sum_i [\theta(R_i) - \theta(PR_i)], \quad (2)$$

with $K_1$ and $K_2$ being experimentally chosen.

In obtaining the average phase error in equation (2), the summation must not be taken in modulo $2\pi$. A straightforward way of adding the angles of a plurality of complex numbers is simply to multiply the complex numbers together, since the phase angle of the complex product is the sum of the angles of the multiplicands. However, this sum is normally obtained modulo $2\pi$ and, since each term (angle error) of the sum may not be small, this approach may result in an erroneous average. To obviate this problem, the averaging and complex number generation functions of units 45 and 52 are preferably processor-implemented by determining the angle of the sum of the complex numbers, which is approximately the same as the average of the individual phase angles. This occurs because individual angles are nearly equal, namely the individual phases are hardly changed during the frame-time in a signal transmission encoding scheme as is employed in the above-referenced system. Preferably, these processing operations are carried out through an additional phase measurement programming sequence in the overall system processing unit through which the transversal filter function and data estimate processing sequences are performed. Since the implementation of this processing scheme, given the above description, can be carried out with commercially available equipment and the programming of such functions is well within the skill of the routineer they will not be described in further detail here. Thus, averaging unit 45, complex number generator 52 and multiplier 54 represent the above phase angle processing equations (1) and (2) to produce corrected samples $CR_i$ in which each received sample is corrected by a constant phase $K_1 DP$ plus an additional correction factor which increases linearly with time during the frame. This linear increase or ramp is, in effect, a frequency offset correction; when accumulated from-to-frame, it serves the function of doppler tracking as well as phase tracking.

The output of multiplier unit 54 corresponds to the individual corrected samples $CR_0, CR_1 \ldots CR_{N-1}$ which are then employed for updating the weighting coefficiencies as well as the data estimates and decision functions of unit 34.

It should be observed that the phase tracking function, per se, of which unit 14 is comprised is, in and of itself, well-known, so that above-referenced functional description of the same will be readily understood by those skilled in the art. However, it has not been previously employed to solve the problem of rapid phase variations occurring in a high frequency signal processing modem of the type referenced above. By employing such a phase tracking system to monitor the difference in phase between the output of the signal prediction circuitry and the actual received values, the problem of adjusting multidimensional filter function, namely a plurality of weighting coefficients, is reduced to a single dimensional, and fairly low frequency, problem that can be solved using a fairly simplified phase tracking scheme. By employing this technique in the present invention, the performance of the signal processing circuitry has been observed to show significant improvement for rapid channel variations or rapid doppler variations.

While we have shown and described one embodiment in accordance with the present invention, it is understood that the same is not limited thereto but is susceptible to numerous changes and modifications as known to those skilled in the art and we therefore do not wish to be limited to the details shown and described herein but intend to cover all such changes and modifications as are encompassed by the scope of the appended claims.

We claim:

1. For use in a data communications receiver apparatus in which signals that have been received from a dispersive channel are processed by simulating the effect of the dispersive channel on signals transmitted thereover and generating estimates of the originally transmitted signals in accordance with a preselected relationship between prescribed characteristics of the simulated effect of the dispersive channel and the received signals, an arrangement for compensating for the effect of rapid phase changes of said channel on the received signals comprising:

first means for measuring the average difference in phase between generated estimates of the received signals and actually received signals; and second means for modifying the values of the actually received signals to be employed in generating estimates of the originally transmitted signals based upon said average difference in phase as measured by said first means.

2. An arrangement according to claim 1, wherein said first means includes means for generating a measure of said average difference in phase DP in accordance with the relationship:

$$DP = \frac{1}{N} \sum_i [\theta R_i - \theta PR_i],$$

wherein

N is the number of signal samples over which the average is measured, $\theta R_i$ is the phase of a respective actually received signal sample, and $\theta PR_i$ is the phase of a respective generated estimate of a received signal sample.

3. An arrangement according to claim 2, wherein said second means includes means for modifying successive actually received signal values $R_i$ to produce corrected received signal values $CR_i$ where $i=0, 1, \ldots N-1$, which corrected received signal values are employed in generating estimates of the originally transmitted signals, in accordance with the relationship:

$CR_i = K_1 DP + i K_2 DP,$ where $K_1$ and $K_2$ are constants.

4. An arrangement according to claim 3, wherein said received signals contain unknown information signals interleaved with known signals and said receiver apparatus includes means for simulating the effect of the dispersive channel by generating an equalization function through which the dispersive characteristics of said medium are represented and for producing, as estimates of said information signals, those information signals capable of having been transmitted which are closest to information signals the values for which minimize the sum of the squares of the magnitude of successive sets of noise signals corresponding to received information and known signals calculated in accordance with said prescribed relationship.

5. An arrangement according to claim 4, wherein said information signals and said known signals are interleaved in sets of signals to form successive frames of transmitted signals, each frame comprising N known signals followed by M unknown signals, said equalization function being defined so that each actually received signal value $R_i$ may be defined by $$R_i = \sum_{j=1}^{N+1} W_j t_{i+j-1} + n_i,$$

where $W_j$ is the jth weighting coefficient of said equalization function, $t_j$ is the value of the jth transmitted signal, $n_i$ is the noise created by said dispersive channel, and the symbol span of said equalization function is $N+1$ symbols.

6. An arrangement according to claim 5, wherein said receiving apparatus further includes means for sampling each received signal a plurality of times and means for processing each of said signal samples to derive, as said estimates, those chosen information signals whose samples result in minimizing the sum of the squares of the magnitudes of successive pluralities of noise signals corresponding to sampled values of received information and known signals.

7. An arrangement according to claim 4, wherein information signals and said known signals are interleaved in successive pluralities of information and known signals to form successive frames of transmitted signals, each frame containing a first plurality of N known signals and a second plurality of M information signals, one of said first and second pluralities of signals immediately succeeding the other of said first and second pluralities of signals so that there is no gap therebetween.

8. An arrangement according to claim 6, wherein said known signals comprise a pseudo noise signal sequence.

9. An arrangement according to claim 5, wherein said receiver apparatus includes means for calculating said estimates of the transmitted values of said information signals in accordance with a relationship that is algebraically equivalent to the expression:

$\hat{B} = (W_2^{*T} W_2)^{-1} (W_2^{*T} (R - W_1 A)),$ wherein: R is represented as a column vector having a preselected number of received signal values as elements, definable by the equation $R = WT + N$, T being a column vector with a prescribed number of transmitted signal values as elements, N being a column vector having a predetermined number of noise values as elements, and W being a prescribed weighting coefficients matrix containing a preestablished number of weighting coefficients, so that $W_1$, $W_2$, A and B is expressed by the equation $WT = W_1 A + W_2 B$, wherein vectors A and B respectively correspond to those portions of said T column vector containing the transmitted known signals and transmitted information signals, and $\hat{B}$ denotes the calculated value of B.

10. An arrangement according to claim 9, wherein said receiving apparatus further includes means for sampling each received signal a plurality of times thereby obtaining plural channels of received signal values, and signal processing is carried out for each of said channels and said receiving apparatus further includes means for producing an estimate of an information signal by choosing that information signal capable of being transmitted which is closest to an end one of the $b_1$-$b_m$ value of $\hat{B}$ for that channel for which ($|b_{id} - \hat{b}_i|/\sigma_i$) is smallest, to correspond to said end value, and successively reiterating the equation defining $\hat{B}$ with newly decided end values of $\hat{B}$ considered as known values, for that channel only, until transmitted information signals for each of said M information signals per frame have been chosen.

11. An arrangement according to claim 9, wherein said receiving apparatus includes means for producing, as said estimates of said information signals, those information signals capable of being transmitted for which the ratio of ($|b_{id} - \hat{b}_i|/\sigma_i$) is smallest, where $\hat{b}_i$ is a respective one of the calculated values of B, $b_{id}$ is a chosen information signal value corresponding to the calculated value $\hat{b}_i$, and $\sigma_i$ is the standard deviation of the error $e_i = b_i - \hat{b}_i$, $\sigma^2$ being the variance of the additive noise terms $n_1$ through $n_{N+M}$, with the equation defining $\hat{B}$ being reiterated successively with new values of $b_i$ being considered as known values, until transmitted information signals for each of said M information signals per frame have been chosen.

12. An arrangement according to claim 9, wherein said receiver apparatus includes means for producing estimates of an information signal by choosing that information signal capable of being transmitted which is closest to an end one of the $b_1 - b_m$ values of B for which ($|b_{id} - b_i|\sigma_i$) is smallest, where $\hat{b}_i$ is a respective one of the calculated values of $\hat{B}$, $b_{id}$ is a chosen information signal value corresponding to the calculated value $\hat{b}_i$, and $\sigma$ is the standard deviation of the error $e_i = b_i - \hat{b}_i$, to correspond to said end value, and successively reiterating the equation defining $\hat{B}$ with newly decided end values of $\hat{B}$ considered as known values, until transmitted information signals for each of said M information signals per frame have been chosen.

13. An arrangement according to claim 5, wherein said receiver apparatus includes means for modifying the weighting coefficients of said equalization function for each frame of received signals based upon M information signals and estimated weighting coefficients of a previous frame.

14. An arrangement according to claim 13, wherein said weighting coefficients modifying means includes means for correlating the errors between the received signal values and calculated signal values based upon M information signals, the 2N known values for the frame of interest and the previous frame, and the weighting coefficients of the previous frame and for updating the weighting coefficients of said equalization function by a fraction of the correlation.

15. An arrangement according to claim 9, wherein said receiver apparatus includes means for modifying the weighting coefficients of said equalization function for each frame of received signals based upon M information signals and estimated weighting coefficients of a previous frame.

16. An arrangement according to claim 15, wherein said weighting coefficients modifying means includes means for correlating the errors between the received signal values and calculated signal values based upon M information signals, the 2N known values for the frame of interest and the previous frame, and the weighting coefficients of the previous frame and for updating the weighting coefficients of said equalization function by a fraction of the correlation.

17. An arrangement according to claim 15, wherein said receiver apparatus includes means for synchronizing the replica of said known signals generated by said generating means with the known signals contained in the transmitted signals as received by said receiving apparatus.

* * * * *